US008794178B2

(12) United States Patent
Mergner et al.

(10) Patent No.: US 8,794,178 B2
(45) Date of Patent: Aug. 5, 2014

(54) COATING METHOD AND DEVICE (75) Inventors: Bernd Mergner, Rheinfelden (DE); Stephane Masson, Village neof (FR)

(73) Assignee: Umicore AG & Co. KG, Hanau-Wolfgang (DE)

(*) Notice: Subject to any disclaimer, the term of this patent is extended or adjusted under 35 U.S.C. 154(b) by 0 days.

(21) Appl. No.: 13/577,168

(22) PCT Filed: Feb. 8, 2011

(86) PCT No.: PCT/EP2011/051826
§ 371 (c)(1),
(2), (4) Date: Aug. 3, 2012

(87) PCT Pub. No.: WO2011/098450
PCT Pub. Date: Aug. 18, 2011

(65) Prior Publication Data
US 2012/0321537 A1    Dec. 20, 2012

(30) Foreign Application Priority Data
Feb. 9, 2010 (DE) .......... 10 2010 007 499

(51) Int. Cl.
*B05C 3/02* (2006.01)
*B05D 7/22* (2006.01)

(52) U.S. Cl.
USPC ......................................... 118/408; 427/230

(58) Field of Classification Search
None
See application file for complete search history.

(56) References Cited

U.S. PATENT DOCUMENTS

| 2,728,690 | A |   | 12/1955 | Saeman |
|-----------|---|---|---------|--------|
| 4,360,157 | A | * | 11/1982 | Quenneville .................... 239/61 |
| 6,149,973 | A |   | 11/2000 | Foerster et al. |
| 6,164,561 | A | * | 12/2000 | Yoshida et al. .............. 239/223 |
| 6,746,716 | B2 |  | 6/2004 | Kiessling et al. |
| 7,094,728 | B2 |  | 8/2006 | Yan et al. |
| 7,476,417 | B2 |  | 1/2009 | Dettling et al. |
| 7,722,829 | B2 |  | 5/2010 | Punke et al. |
| 2002/0007788 | A1 | * | 1/2002 | Nonomura et al. .......... 118/698 |
| 2006/0177592 | A1 | * | 8/2006 | Takebe et al. ................. 427/458 |
| 2008/0200328 | A1 |  | 8/2008 | Eberle et al. |
| 2009/0305874 | A1 |  | 12/2009 | Pfeifer et al. |
| 2010/0243101 | A1 | * | 9/2010 | Matsumoto .................... 141/27 |
| 2010/0319332 | A1 |  | 12/2010 | Jeske et al. |

FOREIGN PATENT DOCUMENTS

| DE | 1 577 945 A1 | 4/1969 |
| DE | 10 2005 024 124 A1 | 11/2006 |
| DE | 10 2008 055 156 A1 | 7/2009 |
| EP | 0 941 763 A1 | 9/1999 |
| EP | 0 957 064 A1 | 11/1999 |
| EP | 1 273 344 A1 | 1/2003 |
| GB | 1013334 | 12/1965 |
| WO | WO 2008/065794 | * 5/2008 ................ B05B 5/16 |

OTHER PUBLICATIONS

International Search Report for PCT/EP2011/051826 mailed Jun. 21, 2011 (English translation attached).

* cited by examiner

*Primary Examiner* — Dah-Wei D Yuan
*Assistant Examiner* — Charles Capozzi
(74) *Attorney, Agent, or Firm* — Smith, Gambrell & Russell, LLP (57) ABSTRACT

The invention relates to a novel coating device, the method carried out using said device, products obtained thereby, and use of said products.

14 Claims, 5 Drawing Sheets

COATING METHOD AND DEVICE

Various problems arise during the coating of ceramic or metallic honeycomb bodies/filters, referred to below as substrates, with liquid coating media.

One possibility for coating substrates is to bring the openings on one side thereof into contact with the coating medium made available and to draw the liquid coating medium through the channels of the substrate by applying a vacuum to the opposite side of the substrate. If the intention is to coat the channels on only part of the length thereof, it is disadvantageous that different channels are coated over different lengths due to the inevitable flow profile which arises.

If the coating medium is forced into the channels by pressure against the force of gravity, there is then a need to check (generally by means of a sensor) when the liquid emerges at the top in the case of complete coating of the channels. In the case of coating over part of the length of the channels, the height of the liquid column of coating medium within the channels is determined by sensors. However, this method does not work if the substrate is composed of conductive or semi-conductive materials, such as metals or silicon carbide.

Another disadvantage is that the coating media generally contain ceramic particles, which have an abrasive action and result in severe wear in the case of pumps for transporting the coating medium (e.g. piston pumps).

The object of the present invention was to provide an arrangement for coating substrates which does not have the above disadvantages of the prior art.

This object is achieved by an arrangement for coating substrates with liquid coating media (113, 213), which has a cylinder (102, 202) filled with a liquid (103, 203) and having a piston (101, 201), wherein the liquid-filled cylinder (102, 202) communicates with a tank (112, 212), in the interior of which a displacement body (111, 211) is arranged in such a way that, when the piston (101, 201) is moved, the displacement body (111, 211) is moved proportionally by the liquid (103, 203), and the tank (112, 212) communicates with the coating device (122, 222) for the substrate (121, 221), wherein the displacement body (111, 211) acts on the liquid coating medium (113, 213), with the result that a proportional change in the level of liquid coating medium (113, 213) in the coating device (122, 222) is brought about.

BRIEF DESCRIPTION OF THE INVENTION

1. An arrangement for coating substrates for the production of exhaust gas purification catalysts, particularly for motor vehicles, which are cylindrical support bodies and each have two end faces (301), a circumferential surface (302) and an axial length L and are traversed from the first end face to the second end face by a multiplicity of channels (310), with liquid coating media, which has a cylinder filled with a liquid and having a piston, wherein the liquid-filled cylinder communicates with a tank, in the interior of which a displacement body is arranged in such a way that, when the piston is moved, the displacement body is moved proportionally by the liquid, and the tank communicates with the coating device for the substrate, wherein the displacement body acts on the liquid coating medium, with the result that a proportional change in the level of liquid coating medium in the coating device is brought about.
2. The arrangement according to point 1, wherein the piston is moved by an electric actuator.
3. The arrangement according to point 1 or 2, wherein the liquid is located inside the displacement body and the liquid coating medium is located outside, and the dosed outer sides of the displacement body act on the coating medium.
4. The arrangement according to point 1 or 2, wherein the liquid is located outside the displacement body and the liquid coating medium is located inside, and the closed inner sides of the displacement body act on the coating medium.
5. The arrangement according to one or more of points 1 to 3, wherein the coating device is fitted with sensors which respond to the level of liquid coating medium and are connected to a control unit, which monitors the movement of the piston and processes the signal transmitted by the sensors in order to monitor the movement of the piston, thus ensuring that there is a reproducible level in the coating device, irrespective of the available quantity of liquid medium.
6. The arrangement according to one or more of points 1 to 5, which has a sensor for monitoring the position of the displacement body.
7. The arrangement according to one or more of points 1 to 6, which has a sensor for monitoring the liquid level of the liquid coating medium within the substrate.
8. A method for coating substrates, comprising the following steps:
   preparation of the substrate;
   preparation of an arrangement according to one of points 1 to 7;
   arrangement of the substrate on the coating device;
   initiation of the movement of the piston, with the result that the liquid displaced by the piston is moved the displacement body proportionally to the quantity of liquid volume displaced;
   action of the displacement body on the coating medium, with a volume of coating medium proportional to the movement of the displacement body being displaced, and a corresponding rise in the level of coating medium in the coating device being brought about;
   penetration of the coating medium into the channels of the substrate up to the desired filling level or coated length of the channels proportionally to the displaced volume of coating medium;
   removal of the coating medium from the channels of the substrate, with the coating forming in the channels.
9. The method for coating substrates according to point 8, comprising the following steps:
   preparation of the substrate;
   preparation of an arrangement according to one of points 1 to 7;
   arrangement of the substrate on the coating device;
   initiation of the movement of the piston, with the result that the liquid displaced by the piston moves the displacement body proportionally to the quantity of liquid volume displaced;
   action of the displacement body on the coating medium, with a volume of coating medium proportional to the movement of the displacement body being displaced, and a corresponding rise in the level of coating medium in the coating device up to a first level of coating medium being brought about;
   detection of the attainment of the first level of coating medium;
   renewed initiation or continued movement of the piston, with the result that the liquid displaced by the piston moves the displacement body proportionally to the quantity of liquid volume displaced;

action of the displacement body on the coating medium, with a volume of coating medium proportional to the movement of the displacement body being displaced, and a corresponding rise in the level of coating medium in the coating device up to a second level of coating medium being brought about, with the result that the coating medium penetrates into the channels of the substrate up to the desired filling level or coated length of the channels proportionally to the displaced volume of coating medium;

removal of the coating medium from the channels of the substrate, with the coating forming in the channels.

10. The method according to point 9, wherein the second level of coating medium is within the substrate.

11. The method according to one or more of points 8 to 10, wherein a substrate which has been wetted or has been impregnated with an acid, alkaline solution or salt solution is arranged on the coating device.

12. The method according to one or more of points 8 to 11, wherein the removal of the coating medium is brought about by applying a vacuum to the lower end face of the substrate.

13. A coated substrate for the production of exhaust gas filters for motor vehicles, in which the channels are provided on the inside with at least one catalytically active coating, the coated length of the channels is less than the axial length L, and the coated length of the channels in the case of at least 95% of the channels of a substrate differs by no more than 5 mm, preferably no more than 3 mm.

14. The coated substrate according to point 13 having a porosity of 40% to 75%.

15. The coated substrate according to point 13 or 14 having a mean pore size of more than 7 µm.

16. The coated substrate according to one of points 13 to 15 having a wall thickness of 0.002 inch to 0.1 inch.

17. The coated substrate according to one of points 13 to 16 having a cell density of 100 to 400 cells per inch$^2$.

18. The coated substrate according to one of points 13 to 17, wherein the channels are provided on the inside with at least one first catalytically active coating and one second catalytically active coating, the channel lengths coated with the first catalytically active coating and the second catalytically active coating are in each case less than the axial length L of the substrate and, in the case of at least 95% of the channels of a substrate, the channel lengths coated with the first catalytically active coating and the second catalytically active coating respectively differ by no more than 5 mm, preferably 3 mm, from one another, and wherein the spacing between the two coatings in the case of at least 95% of the channels of a substrate is no more than 5 mm, advantageously no more than 3 mm, in particular no more than 1 mm.

19. The coated substrate according to point 18, wherein the first coating is an SCR catalyst and the second coating is an oxidation catalyst.

20. The coated substrate according to point 19, wherein the oxidation catalyst is a noble metal of group VIII of the periodic table of elements, such as platinum, palladium, ruthenium, rhodium, gold, iridium or mixtures thereof.

21. The coated substrate according to point 20, wherein the oxidation catalyst is applied to a porous, solid support, preferably a porous inorganic oxide, such as aluminum oxide or silicon dioxide.

22. The coated substrate according to point 19, wherein the SCR catalyst contains an oxide chosen from the group comprising titanium dioxide, vanadium pentoxide, tungsten trioxide, cerium oxide, zirconium oxide, or mixtures thereof.

23. The coated substrate according to point 22, wherein the SCR catalyst contains titanium dioxide as a matrix, up to 10% by weight of vanadium pentoxide and up to 20% by weight of tungsten trioxide.

24. The coated substrate according to one of points 19 to 23, wherein the first coating is an SCR catalyst containing vanadium pentoxide and aluminum oxide, and the second coating is an oxidation catalyst which contains platinum, gold, palladium and aluminum oxide.

25. The coated substrate according to one of points 19 to 23, wherein the first coating is an SCR catalyst containing titanium dioxide, vanadium pentoxide and tungsten trioxide, and the second coating is an oxidation catalyst which contains platinum and aluminum oxide.

26. The coated substrate according to one of points 19 to 21, wherein the first coating is an SCR catalyst containing a composition of a zeolite, in particular a zeolite exchanged with iron or copper, and the second coating is an oxidation catalyst which contains platinum and aluminum oxide.

27. The coated substrate according to one of points 19 to 21, wherein the first coating is an SCR catalyst which contains a beta zeolite exchanged with iron and having an ammonia storage capacity of at least 20 milliliters of ammonia per gram of catalyst material, and the second coating is an oxidation catalyst which contains platinum and aluminum oxide.

28. The coated substrate according to one of points 19 to 21, wherein the first coating is an SCR catalyst containing a composition of a zeolite, in particular a zeolite exchanged with iron or copper, and the second coating is an oxidation catalyst which contains palladium and/or rhodium as well as aluminum oxide.

29. The use of the arrangement according to one or more of points 1 to 7, of the method as claimed in one or more of claims 8 to 12 for the production of exhaust gas filters for motor vehicles.

30. A method for purifying an exhaust gas stream containing nitrogen oxides and/or hydrocarbons and/or particles, which contains a coated substrate according to one of points 13 to 28.

31. An arrangement for purifying an exhaust gas stream containing nitrogen oxides and/or hydrocarbons and/or particles, which has a coated substrate according to one of points 13 to 28.

DETAILED DESCRIPTION OF THE INVENTION

The piston (101, 201) is advantageously moved by an electric actuator (100, 200). For this purpose, it is possible, for example, to use an electric motor which is provided with a gearwheel and moves a piston provided with a rack.

The substrate (121, 221) is generally a hollow substrate which is composed of metals or ceramics and has at least one inner channel (110, 210, 310), generally a multiplicity of inner channels. The substrates are generally substantially cylindrical support bodies, which each have a cylinder axis, two end faces, a circumferential surface and an axial length L and are traversed from the first end face to the second end face by a multiplicity of channels. Such support bodies are often also referred to as honeycomb bodies. In particular, the substrates can be throughflow honeycomb bodies, which can have a high cell density (number of inner channels per area of cross section) of about $10\,cm^{-2}$ to $250\,cm^{-2}$, but also wall flow filters. The substrate can be composed of, for example, cordierite, mullite, aluminum titanate, silicon carbide or metals such as steel or stainless steel. The substrate is advantageously a monolithic, cylindrically shaped catalyst support body and is traversed by a multiplicity of flow channels parallel to the cylinder axis for the exhaust gases from internal combustion engines. Such monolithic catalyst support bodies are used on a large scale for the production of automotive exhaust gas catalysts. The cross-sectional shape of the catalyst support bodies depends on the installation requirements on the motor vehicle. Catalyst bodies with a round cross section, an elliptical or a triangular cross section are widely used. The flow channels generally have a square cross section and are arranged in a narrowly spaced pattern over the entire cross section of the catalyst bodies. The channel or cell density of the flow channels generally varies between 10 and 250 $cm^{-2}$, depending on the application. For exhaust gas purification on motor cars, catalyst support bodies with cell densities of about 62 $cm^{-2}$ are still frequently used nowadays. The substrate is advantageously arranged on the coating device in a liquid-tight manner, it being possible to achieve this by means of at least one seal. The seal can be hollow and can be filled with gas or liquid as it is mounted on or inserted into the coating device, and can form a leaktight closure. The leaktightness of the joint can be checked by means of a pressure or flow sensor.

The displacement body (111, 211) is a hollow body which expands and contracts again through the appropriate action of pressure and can be produced from any flexible material, such as rubber, plastic or metal, although the material must be inert with respect to the liquid (103, 203) and the liquid medium (113, 213).

The liquid does not have to meet any particular requirements but should not have a corrosive or abrasive action, nor should its properties change under the conditions of use. Hydraulic oil or water are suitable, for example.

The liquid coating medium (113, 213) is, for example, a suspension or dispersion for coating exhaust gas filters for motor vehicles ("washcoat") which contains catalytically active components or precursors thereof and inorganic oxides such as aluminum oxide, titanium dioxide, zirconium oxide or a combination thereof, it being possible for the oxides to be doped with silicon or lanthanum, for example. Oxides of vanadium, chromium, manganese, iron, cobalt, copper, zinc, nickel or rare earth metals such as lanthanum, cerium, praseodymium, neodymium, promethium, samarium, europium, gadolinium, terbium, dysprosium, holmium, erbium, thulium, ytterbium or combinations thereof can be used as catalytically active components. Noble metals such as platinum, palladium, gold, rhodium, iridium, osmium, ruthenium and combinations thereof can also be used as catalytically active components. These metals can also be present as alloys with one another or with other metals or as oxides. The metals can also be present as precursors, such as nitrates, sulfites or organyls of said noble metals and mixtures thereof, and, in particular, palladium nitrate, palladium sulfite, platinum nitrate, platinum sulfite or $Pt(NH_3)_4(NO_3)_2$ can be used in the liquid coating medium. By calcination at about 400° C. to about 700° C., the catalytically active component can then be obtained from the precursor. To coat a substrate for the production of automotive exhaust gas catalysts, a suspension or dispersion of an inorganic oxide can initially be used for coating, after which, in a subsequent coating step, a suspension or dispersion which contains one or more catalytically active components can be applied. However, it is also possible for the liquid coating medium to contain both these components. The liquid coating medium often has a solids content of between 35 and 52% and a viscosity of between 15 and 300 cps.

The geometry of the displacement body (111, 211) can be matched to the internal shape of the tank (112, 212), but this is not absolutely essential. Thus, on the one hand, a bellows with a rectangular or circular base area can be used in a tank of corresponding internal shape and can hence act as it were as a hydraulically expandable stamp on the liquid coating medium (113, 213). It is likewise possible for the displacement body (111, 211) to be designed as a spherical rubber bladder, which acts on the liquid coating medium (113, 213) without any special adaptation to the internal geometry of the tank. The displacement body (111, 211) can fill the tank substantially completely, but this does not absolutely have to be the case as long as the displacement body (111, 211) is sufficiently large to fill with liquid coating medium the coating device (122, 222) and the volume of the substrate (121, 221) to be coated. Apart from the openings, with which it communicates with the cylinder (102, 202) and the coating device (122, 222), the tank (112, 212) must be sealed off or capable of being closed relative to the surroundings. However, it is advantageous if the tank (112, 212) has inlets for liquid coating medium (113) or liquid (203) and can advantageously be opened or disassembled for maintenance and cleaning purposes.

The cylinder (102, 202) can communicate with the tank (112, 212) in various ways. On the one hand, the liquid can be located inside the displacement body (111) and the liquid coating medium (113) can be located outside the displacement body (111) in the tank (112), with the result that the closed outer sides of the displacement body (111) act on the liquid coating medium (113). In this case, a pressure is generated in the tank and, by means of this pressure, the liquid medium (113) is conveyed through an opening out of the tank, via a line (114), into the coating device (122).

In another embodiment of the invention, the liquid (203) can be located outside the displacement body (211) in the tank (212), and the liquid coating medium (213) can be located inside the displacement body (211), with the result that the closed inner sides of the displacement body (211) act on the liquid coating medium (213), and the liquid coating medium (213) is conveyed through an opening out of the tank (212), via a line (214), into the coating device (222).

In another embodiment of the invention, the coating device (122, 222) is fitted with sensors (123, 223) which respond to the level of liquid coating medium (113, 213).

Among possible sensors that are suitable are a refractive index sensor, which responds to the change in the refractive index as the liquid level rises, a conductivity sensor or simply a photoelectric barrier.

It is advantageous if these sensors are connected to a control unit (115, 215) which monitors the movement of the piston (101, 201) and processes the signal transmitted by the sensors (123, 223) in order to monitor the movement of the piston, thus making it possible to ensure that there is a reproducible level (130, 230) of liquid coating medium (113, 213) in the coating device (122, 222), irrespective of the quantity of liquid coating medium (113, 213). If a number of substrates (121, 221) are coated one after the other, the quantity of liquid coating medium (113, 213) in the arrangement decreases successively with each coating operation, with the result that, for the same process parameters, the liquid level in the coating device (122, 222) falls. Through the use of the sensors (123, 223), it is possible to compensate for this effect and to ensure a constant liquid level, even when adding additional liquid coating medium. Through the use of a suitable control unit (125, 225) which processes the signal from the sensors and controls the piston (101, 201) or the, preferably electric, actuator (100, 200) used to actuate the piston, the specified level (130, 230) of liquid coating medium (113, 213) in the coating device (122, 222) can be set automatically.

Moreover, the arrangement according to the invention can have a sensor for monitoring the position of the displacement body. For this purpose, a photoelectric barrier (124, 224), an ultrasound sensor or a mechanical sensor (e.g. toggle switch) which monitors the expansion or position of the displacement body can be used, for example. If the displacement body has a leak, this can be detected by this means since, in this case, the displacement body no longer returns fully into its starting position or expands fully. A sensor of this kind then indicates such an event.

Moreover, the arrangement according to the invention can have a sensor for monitoring the liquid level (123, 232) of the liquid coating medium within the substrate (121, 221). In this way, the supply of liquid coating medium into the substrate can be interrupted when the substrate has been coated for the desired substrate length. However, such a sensor is not always necessary since, of course, it is one advantage of the arrangement according to the invention that this monitoring no longer has to be carried out if the internal volume of the substrate is known. However, it may be advantageous if a sensor of this kind is present for the purpose of calibrating the arrangement.

The invention also relates to a coated substrate for the production of exhaust gas filters or exhaust gas purification catalysts, in particular for motor vehicles, in which the channels are provided on the inside with a catalytically active coating, the coated length of the channels is less than the axial length L, and the coated length of the channels in the case of at least 95% of the channels of a substrate differs by no more than 5 mm, preferably no more than 3 mm. Exhaust gas filters in the sense according to the invention can be produced either from throughflow honeycomb bodies, which perform only chemical but not mechanical cleaning of the exhaust gases (e.g. removal of soot), or from wall flow filters for example, where the exhaust gases are passed through the porous walls of the flow channels, thereby effecting both chemical and mechanical cleaning of the exhaust gases.

The channels of the substrates are often not coated over the entire axial length L but, as described above, only over part of the length thereof. It is advantageous here if the length over which the channels are coated on the inside is substantially the same for all the channels, if possible. After the internal coating of the channels of the substrates with the arrangement according to the invention, these substrates are then dried and subjected to at least one heat treatment.

The finished substrates, which are suitable for the production of exhaust gas filters for motor vehicles, have a particularly uniform coating, which is characterized in that the coated lengths of the different channels differ from one another by no more than 5 mm, in particular 3 mm, this applying to at least 95% of all the channels of a substrate, advantageously at least 99% of all the channels of a substrate, in particular 100% of all the channels. Defects may mean that the flow and pressure conditions in some channels of a substrate differ greatly from the other channels, the effect being that the liquid coating medium penetrates with considerably more or considerably less difficulty and is deposited either over a shorter or longer length of the individual channels under the coating conditions. In these cases, the desired uniform coating length may be achieved only in the case of some of the channels, but this is generally more than 95% of all the channels.

The invention also relates to a method for coating substrates which is carried out with the arrangement.

This method for coating substrates has the following steps:
preparation of the substrate;
preparation of an arrangement according to the invention;
arrangement of the substrate on the coating device;
initiation of the movement of the piston, with the result that the liquid displaced by the piston moves the displacement body proportionally to the quantity of liquid volume displaced;
action of the displacement body on the coating medium, with a volume of coating medium proportional to the movement of the displacement body being displaced, and a corresponding rise in the level of coating medium in the coating device being brought about;
penetration of the coating medium into the channels of the substrate up to the desired filling level or coated length of the channels proportionally to the displaced volume of coating medium;
removal of the coating medium from the channels of the substrate, with the coating forming in the channels.

The removal of the coating medium from the channels of the substrate is brought about by applying a pressure gradient, thereby removing excess coating suspension after the interruption of the supply of coating medium to the substrate.

According to the present invention, removal can be brought about by retracting the piston (101, 201) since the level of coating medium in the coating device (122, 222) and the substrate (121, 221) is hereby lowered, thereby producing the pressure gradient and removing the excess coating medium from the channels of the substrate. However, removal of the coating medium can also be brought about by the known prior art methods, and this is described below.

By way of example, this can be done by applying a vacuum to the lower end faces, e.g. by opening a valve leading to an evacuated vacuum reservoir. At the same time, air or some other gas which is inert with respect to the coated substrate and the coating suspension, such as nitrogen, can be supplied from the upper end faces of the substrate to the upper end faces without being pressurized. Since the pressure in the vacuum reservoir falls, there is therefore also a reduction in the flow rate of the gas in the channels of the substrates. A procedure of this kind is described in EP-A1-941763, page 4, line 56 to page 5, line 36, for example, to which reference is made.

However, the procedure can also be reversed and the vacuum applied to the upper end faces and gas supply to the lower end faces of the substrates. It is likewise also possible for this supply to be changed or reversed one or more times, bringing about more uniform coating of the channels in the substrates according to U.S. Pat. No. 7,094,728.

Instead of applying a vacuum ("emptying or freeing the substrates by suction"), it is also possible to apply an excess pressure ("blowing out" the substrates). For this purpose, air or some other gas which is inert with respect to the coated substrates and the coating suspension, such as nitrogen, is supplied to the upper or lower end face under pressure. During this process, the end faces which lie opposite the end faces subjected to gas pressure must ensure that a sufficient quantity of gas can flow off. For this purpose, a vacuum can be applied, but this is not absolutely essential. However, a gas or liquid pressure should not also be applied from the opposite sides to ensure a gas flow rate sufficient to remove excess coating suspension from the channels of the substrates. In this case too, as in the method according to U.S. Pat. No. 7,094,728 outlined in brief above, the excess pressure can be supplied alternately from the upper and lower end faces.

After removal of the excess coating suspension, the substrates are, if appropriate, dried and subjected to a heat treatment (calcined).

Before the heat treatment, the substrates can be dried. This measure is optional since the substrate is dried in any case during the subsequent heat treatment.

For this purpose, a flow of preheated air at a temperature of between 20 and 150° C. flowing at a rate of more than 4, preferably 7-10 m/s, for 5 to 20 s can be passed through the channels of the substrate, from below for example, against the force of gravity after removal from the coating device. By means of this type of pre-drying before heat treatment (calcination), clogging of the flow channels or narrowing of the channels at the lower end of the substrates, which is often observed at very high rates of charge, can be avoided. This additional measure makes it possible to charge the substrate with a higher quantity of coating than normal without the flow channels closing up or narrowing during the drying and calcination process. The concentration of the coating dispersion on the substrate can thus be increased by this measure.

The heat treatment is generally carried out at a temperature of about 150° C. to about 800° C., in particular at about 200° C. to 700° C., advantageously at about 250° C. to about 600° C. The time for heat treatment is about 1 to 5, advantageously 2 to 3 hours at a heating rate of about 10° C./min to about 50° C./min, in particular about 20° C./min to about 40° C./min, advantageously about 35° C./min to about 45° C./min, the heating rates relating to the temperature of the furnace. In the case of batchwise heat treatment, the heating rates can be achieved by appropriate controlled heating of the furnace or, in a continuous process, by controlling the feed rate of the substrates through a tunnel furnace, which is operated with a defined temperature profile.

In one embodiment of the method of the invention, the substrate is wetted before being arranged on the coating device. In the dry state, the substrates have a considerable absorption capacity for liquids. Particularly when coating highly cellular substrates with cell densities of 120 cm$^{-2}$ and above, this can lead to solidification of the coating medium and blockage of the flow channels even during the filling process. It is therefore advantageous to wet the substrates before coating. This can be a matter of pre-impregnation with an acid, a base or a salt solution. Preimpregnation facilitates the formation of the coating on the channel walls by the sol-gel method. Contact between the coating dispersion and the pre-impregnated channel walls shifts the pH of the dispersion. The dispersion is thereby converted into a gel.

In another embodiment of the method of the invention, the displacement body acts on the coating medium in such a way that a volume of coating medium proportional to the movement of the displacement body is displaced, and a corresponding rise in the level of coating medium in the coating device is brought about until a first level of coating medium in the coating device has been achieved. This first level is defined so that the liquid level in the coating device is always the same before the start of each coating operation on a substrate, thus making it possible to achieve a reproducible coated length of the channels, even when the quantity of liquid coating medium decreases. The attainment of the first level can be detected by means of a signal triggered by the sensors (123, 223).

After the attainment of the first level of coating medium, the volume of coating medium required to coat the substrate (i.e. the volume required to coat the insides of the channels of the substrate up to the desired coated length of the channels) is introduced into the channels. For this purpose, the displacement body acts on the coating medium in such a way that a volume of coating medium proportional to the movement of the displacement body is displaced, and a corresponding rise in the level of coating medium in the coating device is brought about, i.e. the penetration of the coating medium into the channels of the substrate up to the desired filling level or coated length of the channels proportionally to the displaced volume, until a second level of coating medium in the coating device has been achieved. The attainment of the second level can be detected by means of a sensor. While the first level of coating medium is within the coating device (122, 222), the second level of coating medium is either within the substrate (121, 221) or at least on the same level but preferably above the upper end face of the substrate (121, 221). If the second level is within the substrate, a coated length of substrate is achieved which is less than the axial length L thereof. If the second level of coating medium is on the same level but preferably above the upper end face of the substrate (121, 221), the inside of the channels of the substrate is coated over the entire axial length L.

It is advantageous if the monitoring of the second level is carried out by a sensor but only for the purpose of calibration, i.e. the setting of the parameters for control of the arrangement. Once these parameters are known, substrates of the same kind can be coated reproducibly using the same parameters, without monitoring the second level with a sensor in each coating operation.

The (excess) coating medium is then removed from the channels of the substrate, with the coating forming in the channels. The substrates obtained are then dried, if appropriate, and subjected to a heat treatment, as described above.

The invention therefore also relates to a method for coating substrates, comprising the following steps:

preparation of the substrate;

preparation of an arrangement according to the invention;

arrangement of the substrate on the coating device;

initiation of the movement of the piston, with the result that the liquid displaced by the piston moves the displacement body proportionally to the quantity of liquid volume displaced;

action of the displacement body on the coating medium, with a volume of coating medium proportional to the movement of the displacement body being displaced, and a corresponding rise in the level of coating medium in the coating device up to a first level of coating medium being brought about;

detection of the attainment of the first level of coating medium;

renewed initiation or continued movement of the piston, with the result that the liquid displaced by the piston moves the displacement body proportionally to the quantity of liquid volume displaced;

action of the displacement body on the coating medium, with a volume of coating medium proportional to the movement of the displacement body being displaced, and a corresponding rise in the level of coating medium in the coating device up to a second level of coating medium being brought about, with the result that the coating medium penetrates into the channels of the substrate up to the desired filling level or coated length of the channels proportionally to the displaced volume of coating medium;

removal of the coating medium from the channels of the substrate, with the coating forming in the channels.

The present invention thus allows reproducible coated lengths of the channels of the substrates with little deviation in the coated lengths within the substrates and makes available an arrangement for coating which exhibits little wear, even in the case of coating media with a highly abrasive action.

The finished substrates (i.e. coated and heat-treated or calcined substrates), which are suitable for the production of exhaust gas filters for motor vehicles, have a particularly uniform coating, which is characterized in that the coated lengths of the different channels differ from one another by no more than 5 mm, in particular 3 mm, this applying to at least 95% of all the channels of a substrate, advantageously at least 99% of all the channels of a substrate, in particular 100% of all the channels. Defects may mean that the flow and pressure conditions in some channels of a substrate differ greatly from the other channels, the effect being that the liquid coating medium penetrates with considerably more or considerably less difficulty and is deposited either over a shorter or longer length of the individual channels under the coating conditions. In these cases, the desired uniform coating length may be achieved only in the case of some of the channels, but this is generally more than 95% of all the channels. In this case, the coated length of the channels is less than the axial length L. The uniform coating length has the advantage that it is possible in this way to introduce two coatings from the mutually opposite ends of the respective substrate. If these coatings are different and have to be separate from one another (e.g. because the coating components react with one another in an unwanted way or impair each other in their action), a spacing must be maintained and reliably ensured between the two coatings. It is advantageous here if the coating length can be set as accurately and reliably as possible since, in this way, only a short length of the substrate has to be used for the spacing between the coatings, remaining uncoated and thus inoperative. It is thereby possible to achieve improved exhaust gas purification or to reduce the charging of the substrate with coating.

It is thus possible, in a particularly advantageous way, to use the device and the method of the invention to obtain a coated substrate for the production of exhaust gas filters for motor vehicles in which the channels are provided on the inside with at least one first catalytically active coating and one second catalytically active coating, the channel lengths coated with the first catalytically active coating and the second catalytically active coating are in each case less than the axial length L of the substrate and, in the case of at least 95% of the channels of a substrate, the channel lengths coated with the first catalytically active coating and the second catalytically active coating respectively differ by no more than 5 mm, preferably 3 mm, from one another, and wherein the spacing between the two coatings in the case of at least 95% of the channels of a substrate is no more than 5 mm, advantageously no more than 3 mm, in particular no more than 1 mm.

Figures 3A, 3B:
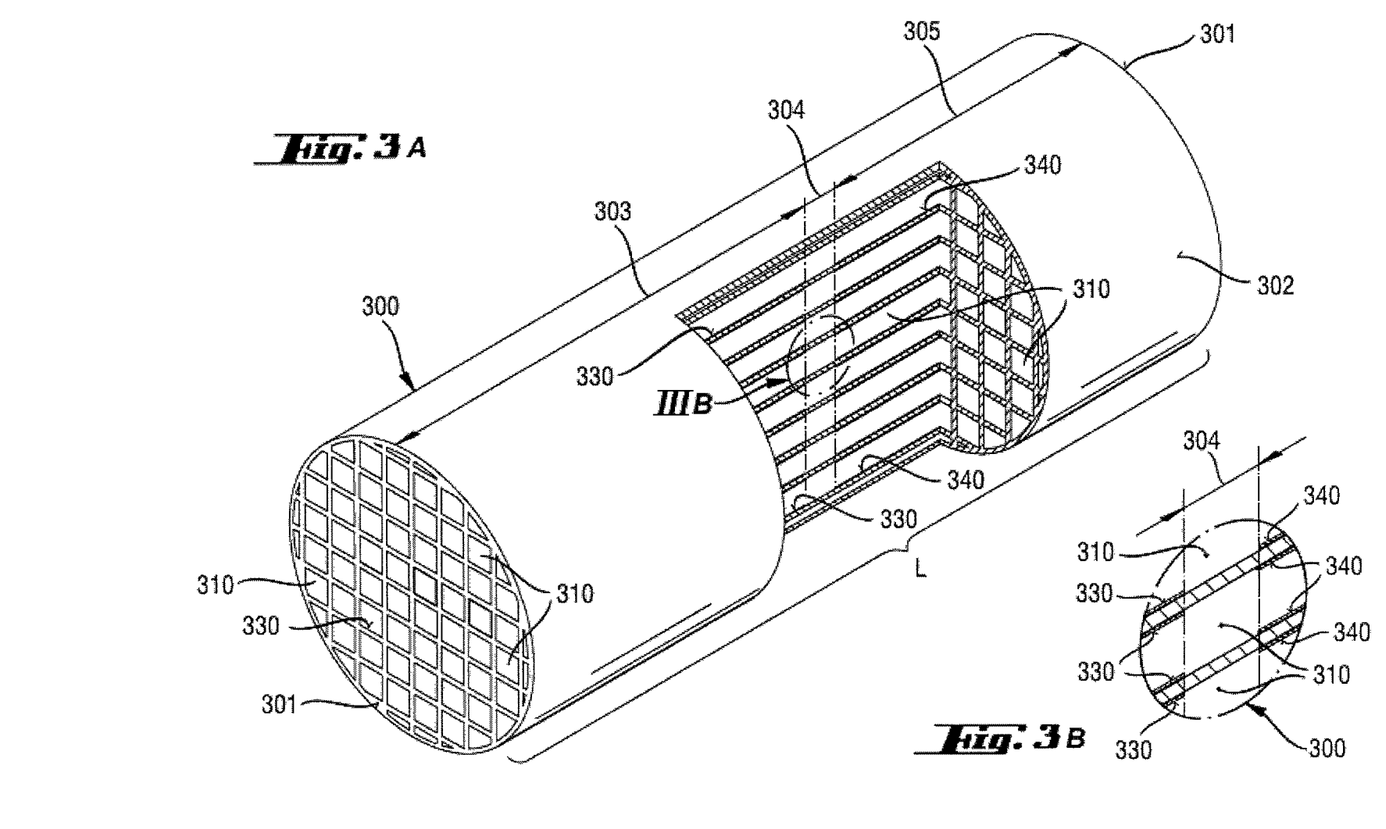

FIGS. 3A and 3B show a coated substrate (300) of this kind. The substrate has two end faces (301), a circumferential surface (302) and a length (L) and is traversed by a multiplicity of channels (310) between the end faces. In this case, the channels are provided with a first coating (330) over a first partial length (303) and with a second coating (340) over a further partial length (305), indicated by thickened lines in FIG. 3A, which form two zones, provided respectively with a first and a second coating. The spacing (304) between the two zones (303, 305) is preferably minimized, for which purpose as uniform a coating length as possible is necessary in both zones (303, 305) in order to avoid overlapping. According to this invention, this coating-free spacing (304) is no more than 5 mm, advantageously no more than 3 mm, in particular no more than 1 mm. In this FIG. 3A, a substrate (300) with circular end faces is illustrated. It is, of course, also possible for the end faces to have rectangular, square, oval, triangular, hexagonal or other polygonal shapes, resulting in a corresponding different three-dimensional shape of the substrate, e.g. prismatic or cuboidal.

The partial lengths provided with the first (330) and the second (340) coating can be the same or different.

The first and second coatings are advantageously of different types. In one embodiment of the invention, at least one of the coatings is an oxidation catalyst or an SCR catalyst. In a particularly advantageous embodiment of the invention, the first coating (330) is an SCR catalyst and the second coating (340) is an oxidation catalyst.

It is advantageous if the oxidation catalyst contains a noble metal of group VIII of the periodic table of elements, such as platinum, palladium, ruthenium, rhodium, gold, iridium or mixtures thereof, advantageously on a porous, solid support, generally a porous inorganic oxide, such as aluminum oxide or silicon dioxide. Platinum on a porous aluminum oxide as a support is particularly advantageous. This coating on the coated substrate generally contains 0.1 to 10 g/ft$^3$ of platinum.

In a specific embodiment of the invention, the SCR catalyst contains an oxide chosen from the group comprising titanium dioxide, vanadium pentoxide, tungsten trioxide, cerium oxide, zirconium oxide, or mixtures thereof.

In another specific embodiment of the invention, the SCR catalyst contains titanium dioxide as a matrix, up to 10% by weight of vanadium pentoxide and up to 20% by weight of tungsten trioxide.

In another specific embodiment of the invention, the first coating contains an SCR catalyst containing vanadium pentoxide and aluminum oxide, and the second coating contains an oxidation catalyst which contains platinum, gold, palladium and aluminum oxide. In this case, the second coating preferably contains 0.1 to 10 g/ft$^3$ of platinum, gold or a combination thereof.

In another specific embodiment of the invention, the first coating contains an SCR catalyst containing titanium dioxide, vanadium pentoxide and tungsten trioxide, and the second coating contains an oxidation catalyst which contains platinum and aluminum oxide. In this case, the second coating preferably contains 0.1 to 10 g/ft$^3$ of platinum.

In another specific embodiment of the invention, the first coating contains an SCR catalyst containing a composition of a zeolite, in particular a zeolite exchanged with iron or copper, and the second coating contains an oxidation catalyst which contains platinum and aluminum oxide. In this case, the second coating preferably contains 0.1 to 10 g/ft$^3$ of platinum.

In another specific embodiment of the invention, the first coating contains an SCR catalyst containing a beta zeolite exchanged with iron and having an ammonia storage capacity of at least 20 milliliters of ammonia per gram of catalyst material, and the second coating contains an oxidation catalyst which contains platinum and aluminum oxide. In this case, the second coating preferably contains 0.1 to 10 g/ft$^3$ of platinum.

In another specific embodiment of the invention, the first coating contains an SCR catalyst containing a composition of a zeolite, in particular a zeolite exchanged with iron or copper, and the second coating contains an oxidation catalyst which contains platinum and/or rhodium as well as aluminum oxide. In this case, the second coating preferably contains 0.1 to 10 g/ft$^3$ of platinum, rhodium or a combination thereof.

The coated substrates, which are suitable for the production of exhaust gas filters for motor vehicles, have a porosity of more than 40%, generally from 40% to 75%, in particular from 45% to 60%. The mean pore size is at least 7 µm, e.g. from 7 µm to 34 µm, preferably more than 10 µm, in particular from 10 µm to 20 µm or from 11 µm to 19 µm. Finished substrates suitable for the production of exhaust gas filters for motor vehicles which have a mean pore size of 11 to 33 µm and a porosity of 40% to 60% are particularly advantageous.

The cell density of the substrates is generally up to 700 or more per inch$^2$ (square inch), although significantly lower cell densities are common, such as 7 to 600, in particular 100 to 400 cells per inch$^2$ (400 cells per inch$^2$ correspond to approximately 62 cells per cm$^2$), and the shapes of the cells can be rectangular, square, circular, oval, triangular or hexagonal or can have some other polygonal form. The cell density is a measure of the number of channels per unit area in plan view which traverse the substrates parallel to the longitudinal axis. The wall thicknesses, i.e. the thickness of the walls which separate the channels from one another, are from 0.002 to 0.1 inch (about 0.005 cm to about 0.25 cm), preferably from 0.002 to 0.015 inch (about 0.005 cm to 0.038 cm). Advantageous substrates have a wall thickness of about 0.01 inch to 0.02 inch (about 0.0254 cm to 0.058 cm), preferably with a porosity of 40% to 60% and a mean pore size of 10 µm to 20 µm.

DETAILED DESCRIPTION OF THE DRAWINGS

Figure 1:
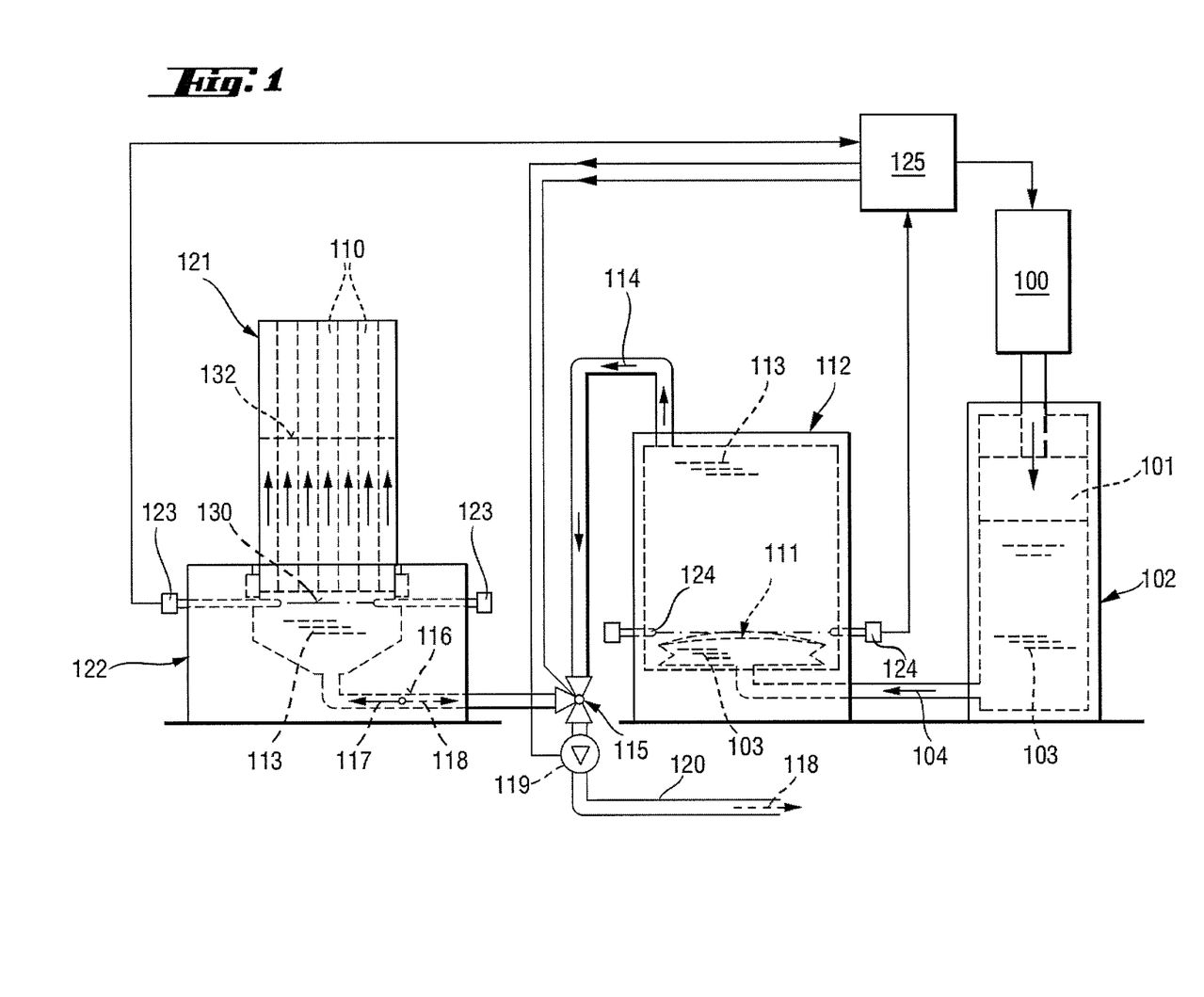

FIG. 1 shows an arrangement of the invention for coating channels (110) in a substrate (121), which has a piston (101), actuated by an actuator (100), in a cylinder (102), which is filled with liquid (103) and, through a connection (104) of the cylinder (102) to the displacement body (111), allows the actuation of the displacement body (111) in the tank (112), which is filled with liquid coating medium (113) and has two line sections (114, 116) with an interposed multiway valve (115) between the tank (112) and the coating device (122), wherein the coating device (122) is provided with the substrate (121) and with sensors (123) for determining the first level (130). Additional sensors (124) are used to monitor the displacement volume of the coating medium (113) and the state of the displacement body (111) in the tank (112).

The values determined by the sensors (123, 124) are transmitted to a control unit (125) which, for its part, controls the actuator (100) and hence the piston (101).

On the one hand, the multiway valve (115) switches the filling of the coating device (122) with coating medium (113) up to the first level (130) in the filling flow direction (117) and, on the other hand, after the second level (132) in the substrate (121) is reached, switches, in the return flow direction (118), the connection to the discharge pump (119) and to the connecting line (120) leading to a storage tank for excess coating medium (113) and for holding it ready for further use.

All the control commands required for this purpose are preferably likewise output by the central control unit (125).

Figure 2:
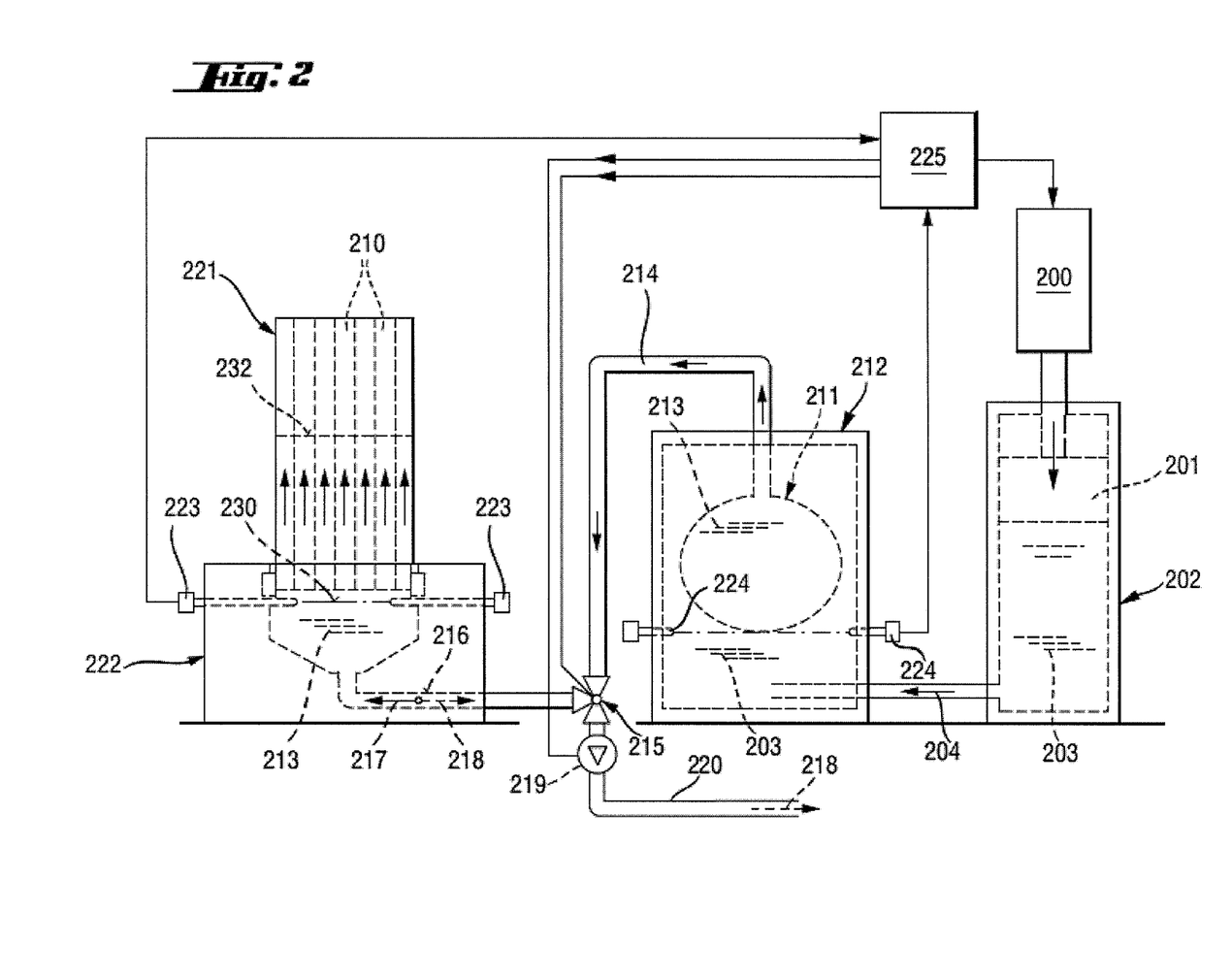

FIG. 2 shows an arrangement of the invention for coating channels (210) in a substrate (221), which has a piston (201), actuated by an actuator (200), in a cylinder (202), which is filled with liquid (203) and, through a connection (204) of the cylinder (202), communicates with the tank (212), in which the displacement body (211) is situated, which contains liquid coating medium (213) and is connected via two line sections (214, 216) with an interposed multiway valve (215) to the coating device (222), which is provided with a substrate (221) and sensors (223) for determining the first level (230) of coating medium (213).

By means of the additional sensors (224) on the tank (212), the displacement volume of coating medium and the state of the displacement body (211) in the tank (212) are monitored. The values determined by the sensors (223, 224) are transmitted to a control unit (225) which, for its part, controls the actuator (200) and hence the piston (201).

On the one hand, the multiway valve (215) switches the filling of the coating device (222) with coating medium (213) up to the first level (230) in the filling flow direction (217) and, on the other hand, after the second level (232) in the substrate (221) is reached, switches, in the return flow direction (218), the connection to the discharge pump (219) and to the connecting line (220) leading to a storage tank for excess coating medium (213) and for holding it ready for further use. All the control commands required for this purpose are preferably likewise output by the central control unit (225).

FIGS. 3A and 3B show in perspective a substrate (300), which has a section broken away in three planes in the central part thereof to make it possible to see into the coating structure according to the invention.

The substrate (300), which is coated in two partial length zones (303, 305), has two end faces (301), a circumferential surface (302) and a length (L) and is traversed by a multiplicity of channels (310) between the two end faces (301).

A first coating (330) is applied to a first partial length zone (303) in the channels (310), while a further partial length zone (305) is provided with a second coating (340).

Between the two partial length zones (303) and (305) or between the two coatings (330) and (340) there is a coating-free zone (304), as FIG. 3B, in particular, shows on an enlarged scale.

BRIEF DESCRIPTION OF THE DRAWINGS

FIG. 1:
100 actuator
101 piston
102 cylinder
103 liquid
104 connection
110 channels—in the substrate 121
111 displacement body
112 tank
113 coating medium
114 line section
115 multiway valve
116 line section
117 filling flow direction
118 return flow direction to remove coating medium 113
119 discharge pump
120 connecting line leading to the reservoir for the coating medium
121 substrate
122 coating device
123 sensor for detecting the level 130
124 sensor for monitoring the position of the displacement body 111
125 control unit
130 first level—of 113 in the coating device 122
132 second level—of 113 in the substrate 121
FIG. 2:
200 actuator
201 piston
202 cylinder
203 liquid
204 connection
210 channels—in the substrate 221
211 displacement body
212 tank
213 coating medium
214 line section 215 multiway valve
216 line section
217 filling direction
218 extraction flow direction of 213
219 discharge and extraction pump
220 connecting line leading to the reservoir for excess coating medium 213
221 substrate
222 coating device
223 sensor for detecting the level 230
224 sensor for monitoring the position of the displacement body
225 control unit
230 first level—in the coating device 222
232 second level—in the substrate 221
FIG. 3:
300 substrate
301 end face
302 circumferential surface
303 first partial length zone
304 spacing—between the two partial lengths 303 and 305
305 second partial length zone
310 channels—in the substrate 300
330 first coating—in the channels 310
340 second coating—in the channels 310
L total length of the substrate 300

Figure 4:
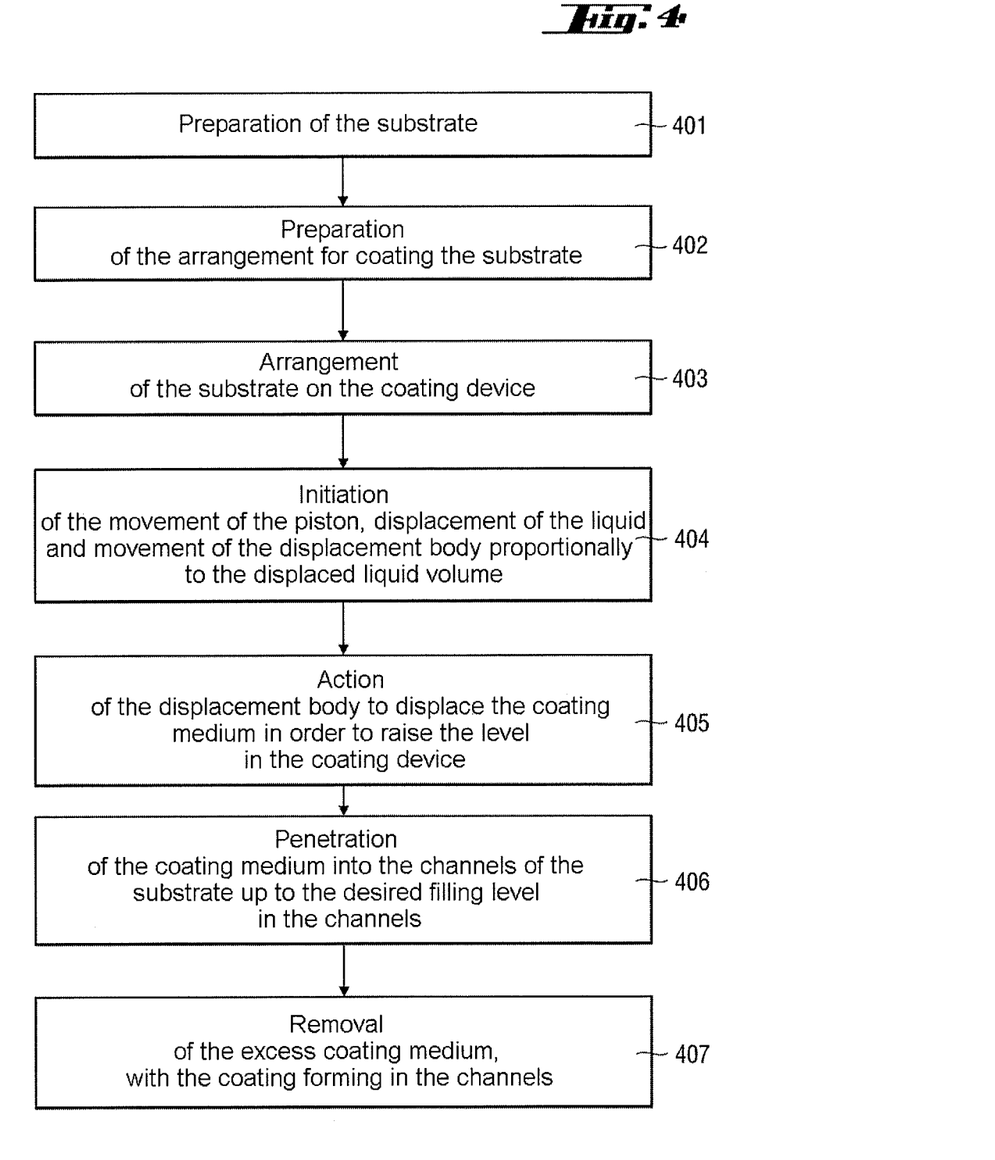

FIG. 4: 401 to 407 denote the seven method steps as claimed in claim 5

Figure 5:
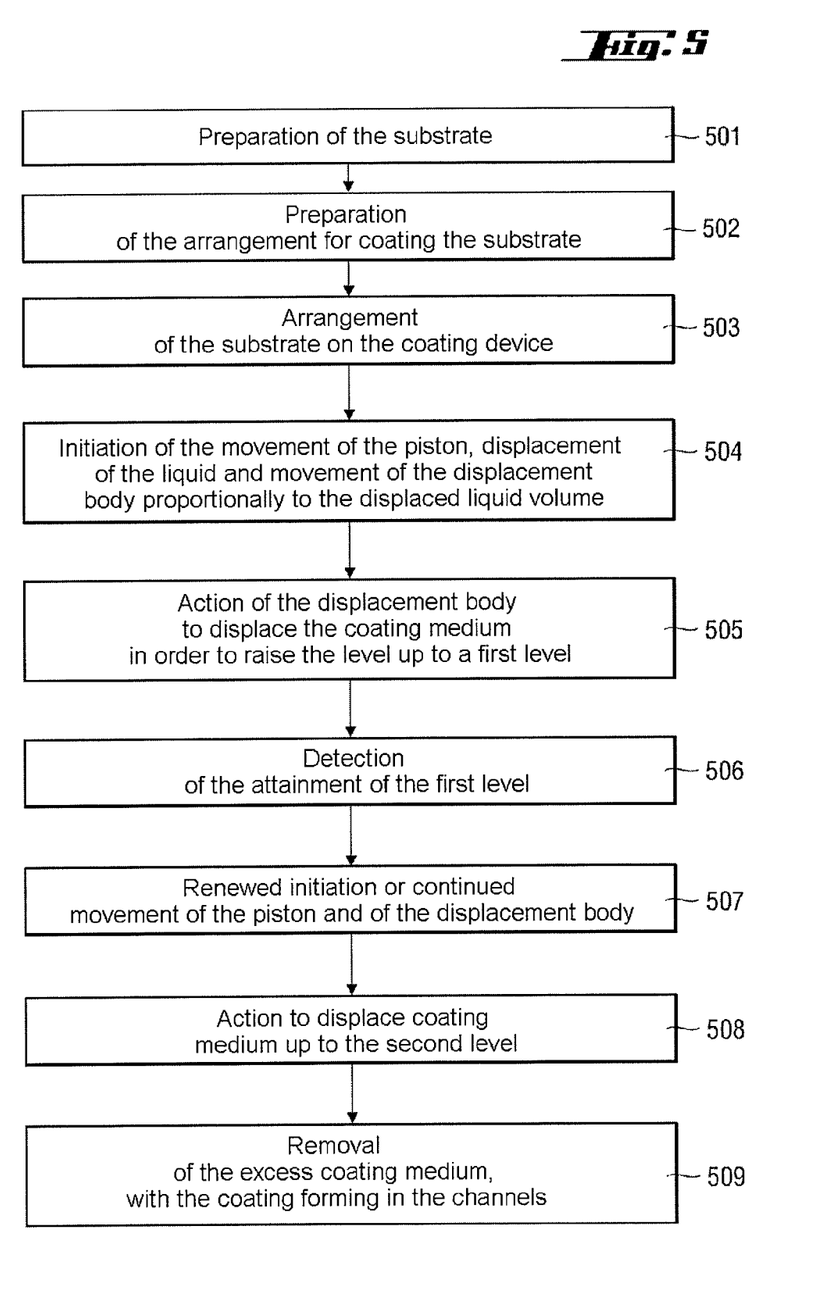

FIG. 5: 501 to 509 denote the nine method steps as claimed in claim 6

EXAMPLE 1

Throughflow honeycomb bodies with a length of 101.6 mm and an oval cross section with a minor axis of 86 mm and a major axis of 131 mm and a cell density of 62 cm$^{-2}$ made from cordierite are coated with a suspension of platinum supported on aluminum oxide (obtained in accordance with example 1 in EP 957064) in water with a solids content of 35% by weight as a coating medium. For this purpose, use is made of an arrangement according to FIG. 2. The coating level is 45.8 mm. After coating, the coated substrates are dried with an air stream at 100° C. and are calcined at 500° C. After every thousand coated support bodies, the coated length is determined after coating by radiography, and the coated lengths of the channels are determined by digital image evaluation, and the difference between the respective maximum and minimum lengths is formed. The difference is always less than 10 mm. 200 coated support bodies are analyzed. Operation of the coating device shown in FIG. 2 is continued. No interruption for maintenance or repair is required in order to carry out 325,000 coating operations.

EXAMPLE 2

The procedure was as in example 1 but an arrangement as shown in FIG. 1 was used. The differences between the maximum and minimum lengths were always less than 2 mm. 170 coated support bodies are analyzed. No interruption for maintenance or repair is required in order to carry out 225,000 coating operations.

The invention claimed is:

1. A system for coating a substrate with liquid coating medium for the production of an exhaust gas purification catalyst, the substrate being a support body having two end faces and an axial length L, and being traversed from a first end face to a second end face by a multiplicity of channels, the system comprising:
a chamber filled with a liquid and having a piston, wherein the liquid-filled chamber communicates with a tank, in the interior of which a displacement body is arranged in such a way that, when the piston is moved, the displacement body is moved proportionally by the liquid, and
the tank communicates with a coating device for the substrate in such a way that, when the displacement body is moved proportionally by the liquid, the displacement body acts on a liquid coating medium in the tank to effect a proportional change in the level of the liquid coating medium in the coating device,
wherein the coating device is configured to join with the substrate in such a way that the coating device is configured to deliver the liquid coating medium to multiple channels of the joined substrate simultaneously.

2. The system as claimed in claim 1, wherein the piston is configured for movement by an electric actuator.

3. The system as claimed in claim 1, wherein
the coating device is fitted with sensors which respond to the level of liquid coating medium and are connected to a control unit, and
the control unit is configured to process a signal transmitted by the sensors to monitor the movement of the piston such that there is a reproducible level of the liquid coating medium in the coating device, irrespective of the available quantity of the liquid coating medium in the tank.

4. The system as claimed in claim 1, further comprising a sensor for monitoring the position of the displacement body.

5. A method for coating a substrate traversed from a first end face to a second end face by a multiplicity of channels with a substrate coating system,
wherein the substrate coating system is a system for coating the substrate with liquid coating medium for the production of an exhaust gas purification catalyst, the substrate being a support body having the two end faces and an axial length L, the substrate coating system comprising:
a chamber filled with a liquid and having a piston, wherein
the liquid-filled chamber communicates with a tank, in the interior of which a displacement body is arranged in such a way that, when the piston is moved, the displacement body is moved proportionally by the liquid, and
the tank communicates with a coating device for the substrate in such a way that, when the displacement body is moved proportionally by the liquid, the displacement body acts on a liquid coating medium in the tank to effect a proportional change in the level of the liquid coating medium in the coating device,
wherein the coating device is configured to join with the substrate in such a way that the coating device is configured to deliver the liquid coating medium to multiple channels of the joined substrate simultaneously;
wherein the method comprises:
arranging the substrate on the coating device of the substrate coating system;
initiating movement of the piston such that the liquid displaced by the piston moves the displacement body proportionally to the volume of liquid displaced;
acting on the coating medium, with the displacement body, so as to move a volume of coating medium proportional to the movement of the displacement body and to achieve a corresponding rise in the level of coating medium in the coating device;

penetrating the coating medium into the channels of the substrate up to a desired filling level or coated length of the channels proportionally to the displaced volume of coating medium;

removing a volume of the coating medium from the channels of the substrate, with a coating forming in the channels.

6. A method for coating a substrate traversed from a first end face to a second end face by a multiplicity of channels with a substrate coating system, wherein the substrate coating system is a system for coating the substrate with liquid coating medium for the production of an exhaust gas purification catalyst, the substrate being a support body having the two end faces and an axial length L, the substrate coating system comprising:

a chamber filled with a liquid and having a piston, wherein the liquid-filled chamber communicates with a tank, in the interior of which a displacement body is arranged in such a way that, when the piston is moved, the displacement body is moved proportionally by the liquid, and the tank communicates with a coating device for the substrate in such a way that, when the displacement body is moved proportionally by the liquid, the displacement body acts on a liquid coating medium in the tank to effect a proportional change in the level of the liquid coating medium in the coating device, wherein the coating device is configured to loin with the substrate in such a way that the coating device is configured to deliver the liquid coating medium to multiple channels of the joined substrate simultaneously;

wherein the method comprises:

arranging the substrate on the coating device of the substrate coating system;

initiating movement of the piston such that the liquid displaced by the piston moves the displacement body proportionally to the volume of liquid displaced;

acting on the coating medium, with the displacement body, so as to move a volume of coating medium proportional to the movement of the displacement body, and to achieve a corresponding rise in the level of coating medium in the coating device up to a first level of coating medium;

detecting attainment of the first level of coating medium;

renewing initiation or continuing movement of the piston, such that the liquid displaced by the piston moves the displacement body proportionally to the volume of liquid displaced;

acting on the coating medium, with the displacement body, so as to move a volume of coating medium proportional to the movement of the displacement body, and to achieve a corresponding rise in the level of coating medium in the coating device up to a second level of coating medium such that the coating medium penetrates into the channels of the substrate up to a filling level or coated length of the channels proportionally to the displaced volume of coating medium;

removing a volume of the coating medium from the channels of the substrate, with a coating forming in the channels.

7. A method for the production of an exhaust gas filter for a motor vehicle through use of a substrate coating system, wherein the substrate coating system is a system for coating a substrate with liquid coating medium for the production of an exhaust gas purification catalyst, the substrate being a support body having two end faces and an axial length L, and being traversed from a first end face to a second end face by a multiplicity of channels, the substrate coating system comprising:

a chamber filled with a liquid and having a piston, wherein the liquid-filled chamber communicates with a tank, in the interior of which a displacement body is arranged in such a way that, when the piston is moved, the displacement body is moved proportionally by the liquid, and the tank communicates with a coating device for the substrate in such a way that, when the displacement body is moved proportionally by the liquid, the displacement body acts on a liquid coating medium in the tank to effect a proportional change in the level of the liquid coating medium in the coating device, wherein the coating device is configured to join with the substrate in such a way that the coating device is configured to deliver the liquid coating medium to multiple channels of the joined substrate simultaneously;

wherein the method comprises:

coating the substrate with the substrate coating system.

8. The method according to claim 5, further comprising preparation of the substrate.

9. The method according to claim 8, wherein the substrate is a motor vehicle exhaust gas purification catalyst substrate.

10. The method according to claim 6, further comprising preparation of the substrate.

11. The method according to claim 10, wherein the substrate is a motor vehicle exhaust gas purification catalyst substrate.

12. The system as claimed in claim 1, wherein the system is configured to deliver a first volume of the liquid coating medium into the channels of the substrate, and to withdraw a second volume of the liquid coating medium from the channels of the substrate, the second volume being less than the first volume.

13. The system as claimed in claim 12, wherein the first volume of the liquid coating medium is delivered into the channels of the substrate by the coating device, and the second volume of the liquid coating medium is withdrawn from the channels of the substrate by the coating device.

14. The system as claimed in claim 1, wherein the coating device comprises at least one seal that is configured to join the coating device with the substrate in a liquid tight-manner.

* * * * *